United States Patent
Dischinger et al.

(10) Patent No.: US 10,620,860 B2
(45) Date of Patent: Apr. 14, 2020

(54) SYSTEM FOR STORING DATA IN TAPE VOLUME CONTAINERS

(71) Applicant: Oracle International Corporation, Redwood Shores, CA (US)

(72) Inventors: Benjamin Dischinger, Redwood Shores, CA (US); Bradford Blasing, Redwood Shores, CA (US); Jeffrey Andre, Redwood Shores, CA (US); David Major, Redwood Shores, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 15/431,615

(22) Filed: Feb. 13, 2017

(65) Prior Publication Data
US 2018/0232147 A1     Aug. 16, 2018

(51) Int. Cl.
*G06F 12/00* (2006.01)
*G06F 3/06* (2006.01)

(52) U.S. Cl.
CPC ............ *G06F 3/064* (2013.01); *G06F 3/067* (2013.01); *G06F 3/0611* (2013.01); *G06F 3/0619* (2013.01); *G06F 3/0647* (2013.01); *G06F 3/0661* (2013.01); *G06F 3/0682* (2013.01); *G06F 3/0686* (2013.01)

(58) Field of Classification Search
CPC ...... G06F 3/064; G06F 3/0619; G06F 3/0647; G06F 3/067
See application file for complete search history.

(56) References Cited

U.S. PATENT DOCUMENTS

| | | | | |
|---|---|---|---|---|
| 5,297,124 | A * | 3/1994 | Plotkin | G06F 3/0607 360/48 |
| 6,816,957 | B1 * | 11/2004 | Halladay | G06F 3/0607 711/170 |
| 7,747,816 | B1 * | 6/2010 | Nourmohamadian | G06F 11/1456 711/111 |
| 2008/0144826 | A1 * | 6/2008 | Chang | G06F 21/602 380/269 |
| 2008/0313385 | A1 * | 12/2008 | Vijayakumar | G06F 3/0613 711/100 |
| 2012/0110055 | A1 * | 5/2012 | Van Biljon | G06Q 30/04 709/201 |
| 2014/0181395 | A1 * | 6/2014 | Vincent | G06F 11/1456 711/111 |
| 2016/0012065 | A1 * | 1/2016 | Takata | H04L 63/0407 707/756 |
| 2016/0028845 | A1 * | 1/2016 | Barr | G06F 11/0751 714/37 |
| 2016/0217810 | A1 * | 7/2016 | Ballard | G11B 5/00813 |
| 2017/0228370 | A1 * | 8/2017 | Wilcock | G06F 17/302 |

\* cited by examiner

*Primary Examiner* — Ryan Bertram
*Assistant Examiner* — Trang K Ta
(74) *Attorney, Agent, or Firm* — Invoke

(57) ABSTRACT

Operations include storing and/or accessing data in tape volume containers. A system receives a request to access a tape block in a data storage tape. The system maps the requested tape block in the data storage tape to an object in a container. The system then retrieves data from the object in the container. The system generates, from the retrieved data, a data stream in tape archive format. The system transmits the data stream, in tape archive format, in response to the request to access the tape block in the data storage tape.

16 Claims, 6 Drawing Sheets

SYSTEM FOR STORING DATA IN TAPE VOLUME CONTAINERS

TECHNICAL FIELD

The present disclosure relates to a data storage management system. In particular, the present disclosure relates to mapping a tape block to an object in an object-based storage system.

BACKGROUND

Storage systems store data according to various corresponding storage architectures. Examples of storage architectures include an object-based storage, tape-based storage, a file system, a block storage, and/or a database.

Object-based storage manages data as objects. Each object is associated with data and metadata. Data includes, for example, information that is used by an end user and/or a business application. As an example, data for a Sales Application may include information about customers, products, and sales. As another example, data for a Human Resources Application may include information about employees, departments, and salaries. Metadata describes how the data is set up and/or stored, or other characteristics about the data itself. Metadata may be used to manipulate and/or manage the objects in a storage system. In an object-based storage system, data is read directly as requested, as opposed to being read in a sequential fashion.

A container (also referred to herein as an object container) stores one or more objects. A container may be, for example, a class, a data structure, or an abstract data type.

A tape drive is a data storage device that reads and writes data to a data storage tape (e.g., a magnetic tape, or a virtual tape volume). Tape-based storage is stable, and is therefore popularly used for offline, archival data storage. A tape drive uses sequential access storage. Thus, a tape drive may need to be physically wound to access a particular piece of data. Data on a tape volume is typically stored in Tape Archive (TAR) format. Typically, a data storage tape has an information region, containing information about what is stored on the tape.

In tape data, as well as other types of data storage, blocks (also referred to herein as "tape blocks") are commonly used to structure data. A block is a collection of data. Blocked data may be read or written a block at a time, which speeds up data streaming. In the case of magnetic tape storage, blocking also reduces the amount of storage required. Thus, blocking is almost always used for magnetic tape storage.

Thus, tape drives have certain drawbacks associated with reading data sequentially, such as latencies from loading the tape drive to a selected location on the tape. Typically, object-based storage systems do not have these issues, because the data can be accessed directly. However, some latencies are associated with more complex object-based storage systems. For example, multi-tiered storage systems exist, where data may need to be retrieved from a remote location before the data is accessible. The retrieval process can create a delay. Thus, although it seems counterintuitive to import the restrictions of tape drive storage into object-based storage, tape drive systems have capabilities for dealing with long delays that are also applicable to object-based storage systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DATA MANAGEMENT FRAMEWORK
3. RETRIEVING DATA FROM A TAPE VOLUME CONTAINER
   A. DATA MANAGEMENT OPERATIONS
   B. STORAGE SYSTEM OPERATIONS
4. STORING DATA TO A TAPE VOLUME CONTAINER
5. EXAMPLE EMBODIMENTS
   A. METADATA
   B. RESTORE OPERATION
   C. EFFICIENT TAPE BLOCK SIZE; ENCRYPTION
   D. INTERFACING WITH A PHYSICAL TAPE VOLUME
6. MISCELLANEOUS; EXTENSIONS
7. HARDWARE OVERVIEW

1. General Overview

Tape drive commands for reading and writing a data stream, in a tape archive format, to a tape-based storage system may reference a data storage tape. The referenced data storage tape is the data storage tape from which the data stream is to be read or to which data stream is to be written.

One or more embodiments include storing a data stream, in a tape archive format, to an object-based storage system in response to receiving a tape drive command to store the data stream in a data storage tape. A data management engine maps the data storage tape, referenced in a tape drive command, to a container of objects in the object-based storage system. The data management system stores the data stream, in the tape archive format, in a set of one or more objects of the identified container. The container storing the data stream, in the tape archive format, may be referred to herein as a "tape volume container."

In an embodiment, the data management engine reads data from an object-based storage system, in response to receiving a tape drive command to access a tape block in a data storage tape. The system maps the requested tape block in the data storage tape to a corresponding object in a container. The system retrieves data, in tape archive format, from the corresponding object in the container. The system generates, from the retrieved data, a data stream in tape archive format. The system transmits the data stream, in tape archive format, in response to the tape drive command.

One or more embodiments described in this Specification and/or recited in the claims may not be included in this General Overview section.

2. Data Management Framework

Figure 1:
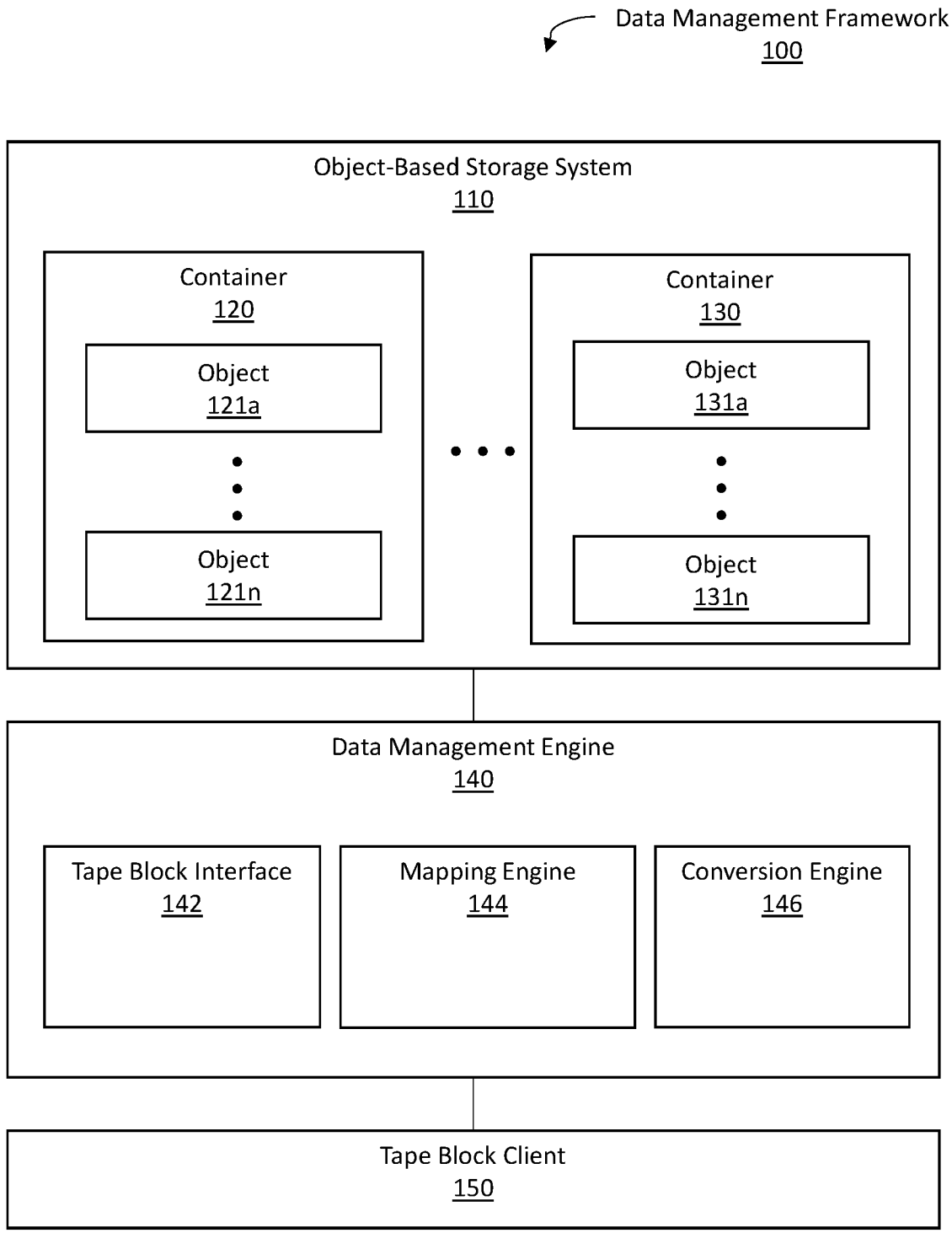
FIG. 1 illustrates a system for data management in accordance with one or more embodiments.

FIG. 1 illustrates a data management framework 100 in accordance with one or more embodiments. A data management framework 100 maps data to an object-based storage system, responsive to a request to access or write data to a tape-based storage system. As illustrated in FIG. 1, the data management framework 100 includes an object-based storage system 110, a data management engine 140, and a tape block client 150. In one or more embodiments, the data management framework 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In an embodiment, the object-based storage system 110 is a storage system that manages data as objects within containers. The object-based storage system 110 may include multiple different storage units and/or devices. The multiple different storage units and/or devices may or may not be of the same type or located at the same physical site. Furthermore, the object-based storage system 110 may be implemented or may execute on the same computing system as the data management engine 140 and the tape block client 150. Alternatively or additionally, the object-based storage system 110 may be implemented or executed on a computing system separate from the data management engine 140 and the tape block client 150. The object-based storage system 110 may be communicatively coupled to the data management engine 140 or the tape block client 150 via a direct connection or via a network.

In an embodiment, a container (e.g., container 120 and container 130) is an organizational structure for a set of objects. Each instance of a container may include a corresponding collection of objects. A set of objects may be referred to as belonging to a particular container referenced by a container identifier. A size of the container depends on the number of objects within the container. Containers may vary in size and complexity. In an embodiment, a container is mapped to a data storage tape. A container that is mapped to a data storage tape may be referred to herein as a tape volume container. A tape block, corresponding to a data storage tape, may be mapped to one or more objects of a tape volume container. A policy may specify that a given container should hold 20 MB of data. As another example, a policy may specify that all data coming from a particular Internet Protocol (IP) address should be stored to a particular container.

As noted above, a container includes objects (e.g., objects 121a-121n and objects 131a-131n). An object may be stored in contiguous memory locations or non-contiguous memory locations of the object-based storage system 110. As an example, an object may include multiple portions such as data and metadata, as described above. The data and metadata may be stored together in contiguous memory locations. Alternatively, the data may be stored in a separate location from the metadata. The data and metadata may be implemented on the same device or on different devices. Alternatively, the data may be stored in data tier and the metadata may be stored in a separate metadata tier. The data tier and the metadata tier may be implemented on the same device or on different devices. Furthermore, the data corresponding to an object may itself be stored in contiguous memory locations or separate non-contiguous memory locations within the data tier.

In an embodiment, the metadata describes what is stored in a container and how to find it. The information in the metadata may include a block number, an offset, what data is stored to the associated data storage tape, and instructions on how to access the data. The metadata may further specify identifying information about the data, such as size and format.

In an embodiment, the data management engine 140 includes one or more software and/or hardware components used for managing data. The data management engine 140 may include functionality to determine when and how data is to be stored to, or retrieved from, an object-based storage system 110. The data management engine 140 may control reading data and/or writing data. The data management engine 140 includes a tape block interface 142, a mapping engine 144, and a conversion engine 146.

In an embodiment, the tape block interface 142 includes functionality to communicate with a tape block client 150. For example, the tape block interface 140 may include functionality receive a request pertaining to data in a tape block from the tape block client 150. The tape block interface 142 may further include functionality to control the streaming of data, in a tape archive format, to the tape block client 150.

The tape block interface 142 may further include functionality for organizing data. As an example, the tape block interface may include functionality for organizing TAR data into tape blocks, and organizing one or more tape blocks into a particular tape volume.

The mapping engine 144 includes functionality for mapping a data structure in an object-based storage system to or from a data structure in a tape-based storage system. The mapping may be achieved by hardware/and or software. For example, the mapping engine may be implemented as software layer that creates an object in an object-based storage system corresponding to a tape block. The mapping engine may name the object based on an identifier of the corresponding tape block. The mapping engine may map a data storage tape to a corresponding tape volume container in an object-based storage system. The mapping engine may further map tape blocks within the data storage tape to corresponding container blocks in the tape volume containers of the object-based storage system. Requests related to a particular tape block in a data storage tape may be addressed using data in a corresponding block in a tape volume container.

The conversion engine 146 includes functionality for converting a command from one format to another. The conversion engine 146 may use software and/or hardware to convert a command. For example, the data management engine 140 receives a command for retrieving data from a tape drive. This command is to be sent to an object-based storage system to retrieve the data. Thus, conversion engine 146 must first translate the command to a form understandable by the object-based storage system. In an embodiment, the conversion engine 146 converts data from one format to another. For example, the conversion engine 146 may convert data to TAR format.

In an embodiment, the tape block client 150 is any type of system and/or device for sending and receiving data, as a tape block. The tape block client may include an archiving engine. An archiving engine is a program for archiving data. The archiving engine may be implemented as software layer that determines, based on policy, when to archive data to a tape block. For example, a policy may dictate that data saved to a disk storage system should be archived to a tape drive, in duplicate, on a biweekly basis. Based on this policy, the archiving engine transmits a request to archive the data to a tape block.

In an embodiment, the archiving engine is part of a hierarchical file management system. Newly saved or recently accessed data is saved to a storage system, such as disk storage, for easy access. The archiving engine periodically archives data to an object-based storage system. As an example, the archiving engine saves a file every five minutes.

In an embodiment, the tape block client 150 may operate responsive to requests from a user. As an example, the tape block client 150 includes a user interface (UI), with functionality to receive user input. For example, the tape block client may include a UI with radio buttons and fillable fields, enabling the tape block client to receive instructions from a user, to retrieve selected data from a tape block. In an embodiment, the tape block client 150 is a storage system. For instance, the tape block client 150 is a local, file-based storage system that periodically backs up its data to a tape block. The local storage system may include metadata specifying data location information such as the name of a data container, an offset within that container, identification information for the data on a tape, and instructions for accessing the data on the tape.

3. Retrieving Data From a Tape Volume Container

A. Data Management Operations

Figure 2A:
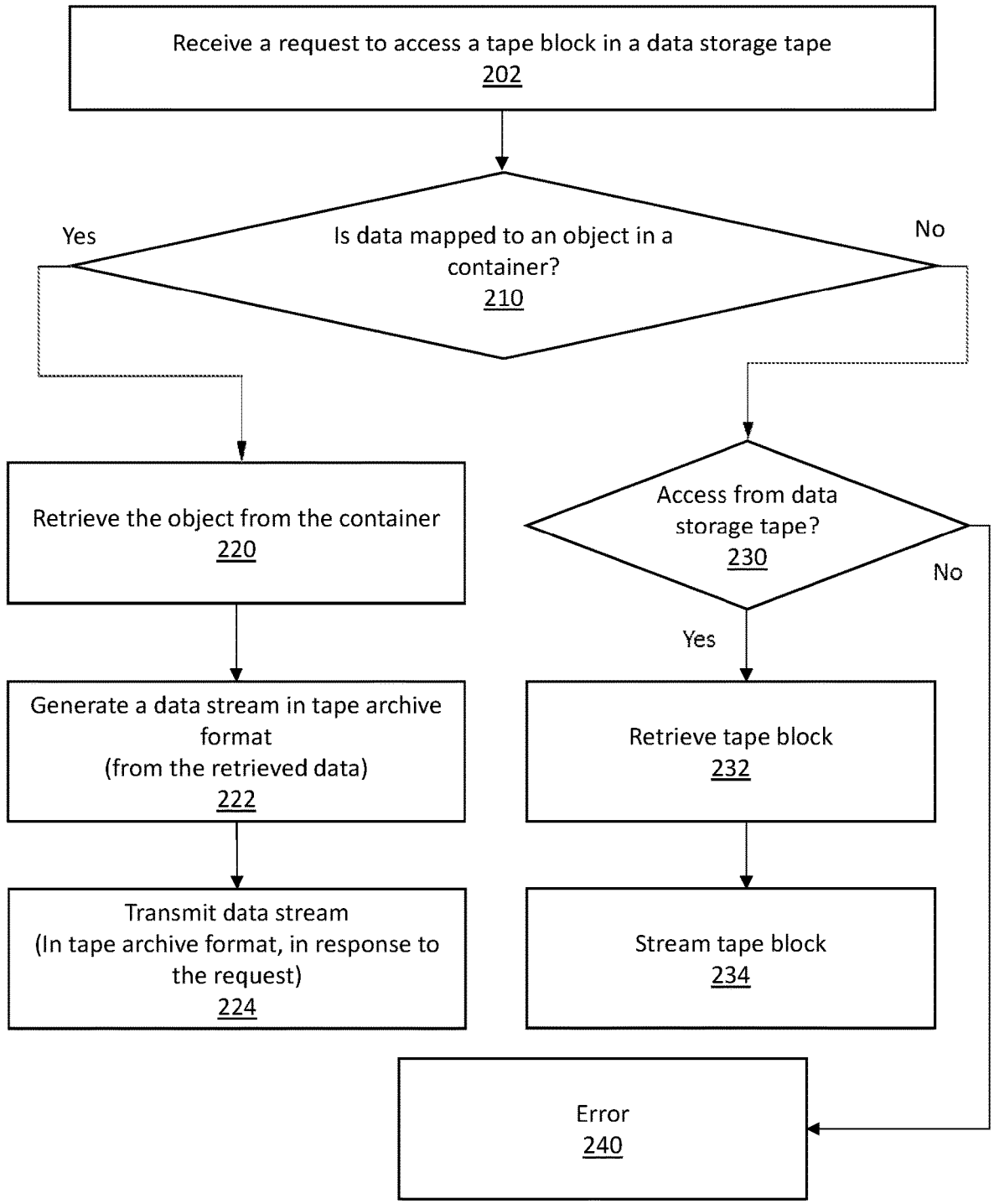
FIG. 2A illustrates an example set of operations performed by a data management engine for reading data in a tape volume container in accordance with one or more embodiments.

FIG. 2A illustrates an example set of operations for retrieving data from a tape volume container, in accordance with one or more embodiments. One or more operations illustrated in FIG. 2A may be modified, rearranged, or omitted altogether. Accordingly, the particular sequence of operations illustrated in FIG. 2A should not be construed as limiting the scope of one or more embodiments.

In an embodiment, a data management engine receives a tape drive request to access data corresponding to a tape block in a data storage tape (Operation 202). For example, the data management engine may receive a request, from an archiving engine, for a file requested by a user. The request may specify a file, that a user is trying to open, which was previously archived by the archiving engine. The request may further include metadata referring to a tape volume, tape block, and offset at which to locate the file.

In an embodiment, the data management engine determines whether the requested data, referenced in relation to a data storage tape, is stored in a container object rather than in the data storage tape (Operation 210). Determining whether the requested data is stored in a container object may include using a mapping between tape block objects and container objects. Specifically, the data management system uses the tape block, identified in the request, to query (a tape block, data storage tape)-to-(block, container) mapping. If the tape block is found in the mapping with a corresponding container block, then data management engine determines that the data is stored in the corresponding container block. Determining whether the data is stored in a container block may include identifying the specific container block which stores the data. If the tape block is not found in the mapping, then the data is not stored in any container block.

As another example, the data management engine determines whether the data is stored in a container object based on a filename corresponding to the data. Particular filename format or filename content may be used for data stored in container objects. If the filename of the requested file has the particular filename format or filename content, used for data stored in container objects, then the corresponding data is determined to be stored in container objects. Once data is determined to be stored in container objects, the (a tape block, data storage tape)-to-(block, container) mapping may be used to identify the container object which includes the data.

If the data is mapped to an object in a container, then the data management engine retrieves the object from the container (Operation 220). Retrieving the object from the container may include transmitting requests for the objects to the object-based storage system. Data stored across multiple objects may require retrieval of the multiple objects from the object-based storage system. Retrieving multiple objects may include specifying a sequential retrieval of objects from a particular starting point and a particular ending point.

In an embodiment, the data management engine generates a data stream, in tape archive format, from the retrieved data in accordance with one or more embodiments (Operation 222). As an example, the data management engine may extract data from multiple objects retrieved from the object-based storage system. The data management engine may concatenate the data retrieved from the multiple objects to generate a file, in a file archive format, to be streamed to a requesting tape client.

In an embodiment, the data management engine transmits the data stream, in tape archive format, in response to the tape drive request (Operation 224). The data management engine may transmit the data stream wirelessly over the internet, and/or physically via a wire or a bus. The data management engine may transmit the data stream sequentially in tape archive format. A recipient of the data stream, receives the data stream in a similar manner as the receipt of data streams extracted from tape blocks of a tape volume.

If the data is not mapped to in an object in a container, then the data management engine attempts to access the data from a data storage tape (Operation 230). Attempting to access the data from the data storage tape may include attempting to load the data storage tape identified in the tape drive request.

If the data storage tape identified in the request does not exist, or is otherwise unavailable, the data management engine generates an error (Operation 240). For example, the data management engine transmits a message that no such data and/or data storage tape exists.

If the data storage tape is successfully loaded, the data management engine retrieves data stored within the tape block identified in the tape drive request (Operation 232). The data management engine navigates to a start offset in the tape volume corresponding to the tape block specified in the tape drive request. Navigating to the start offset may include rewinding or forwarding the tape volume. Once data at the offset is accessible, the data management engine may perform a sequential read of the data until an end offset corresponding to the end of the tape block.

In an embodiment, the data management engine streams the data retrieved from the tape block (Operation 234). The data may be streamed as a sequential data stream, for example, via a wireless or wired connection. Thus, the system can support accessing both a data storage tape (physical or virtual), as well as an object-based storage system.

As an example, a user of a local file-based data system requests to open a file, "File X." The file-based data system includes metadata for File X, indicating that File X is 50 MB in size, and is stored to a tape volume. The file-based data system transmits the request to access File X data in a tape block (500) in a data storage tape (tp2000). The data management engine receives the request to access File X in a tape block in a data storage tape.

Responsive to receiving the request to access File X, the data management engine determines whether the requested data is mapped to an object in a container. The data management engine searches the object-based storage system, based on the tape block and tape volume information received. The data management engine identifies an object in a container corresponding to tape tp2000 at block 500: "data@tp2000/block.000500."

Next, the data management engine retrieves the object from the container. The data management engine has received a request to access a tape block in a data storage tape, but actually needs to access an object in the object-based storage system. The conversion engine must convert the received request into a format corresponding to the object-based storage system. Once the request is in a format understandable by the object-based storage system, the data management engine transmits the converted request to the object-based storage system. Responsive to receiving the converted request, the object-based storage system loads the requested object for streaming. At this point, the object has been retrieved from the container.

Upon retrieval of the object from the container, the data management engine 140 prepares to begin reading from the object-based storage system, in the container "data@tp2000," starting at block 500. The data management engine will continue reading blocks until the amount of data corresponding to File X has been read.

The data management engine begins reading blocks, by instructing the object-based storage system to begin reading objects. The data management engine retrieves the data from the object "data@tp2000/block.000500." Next, the data management engine reads the next block, by requesting data from the object mapped to the next block: "data@tp2000/block.000501." Because 50 MB of data has been requested, the data management engine 140 continues reading blocks until 50 MB of data has been read.

Next, the data management engine transmits the data stream, in tape archive format, in response to the request. As the data management engine reads each block, it returns the data, in tape archive format, to the requesting file-based storage system. The data management engine writes the data comprising File X sequentially to the local storage system for each tape block read. After all data for File X is successfully written, the file is available as a normal file from the local storage system.

B. Storage System Operations

Figure 2B:
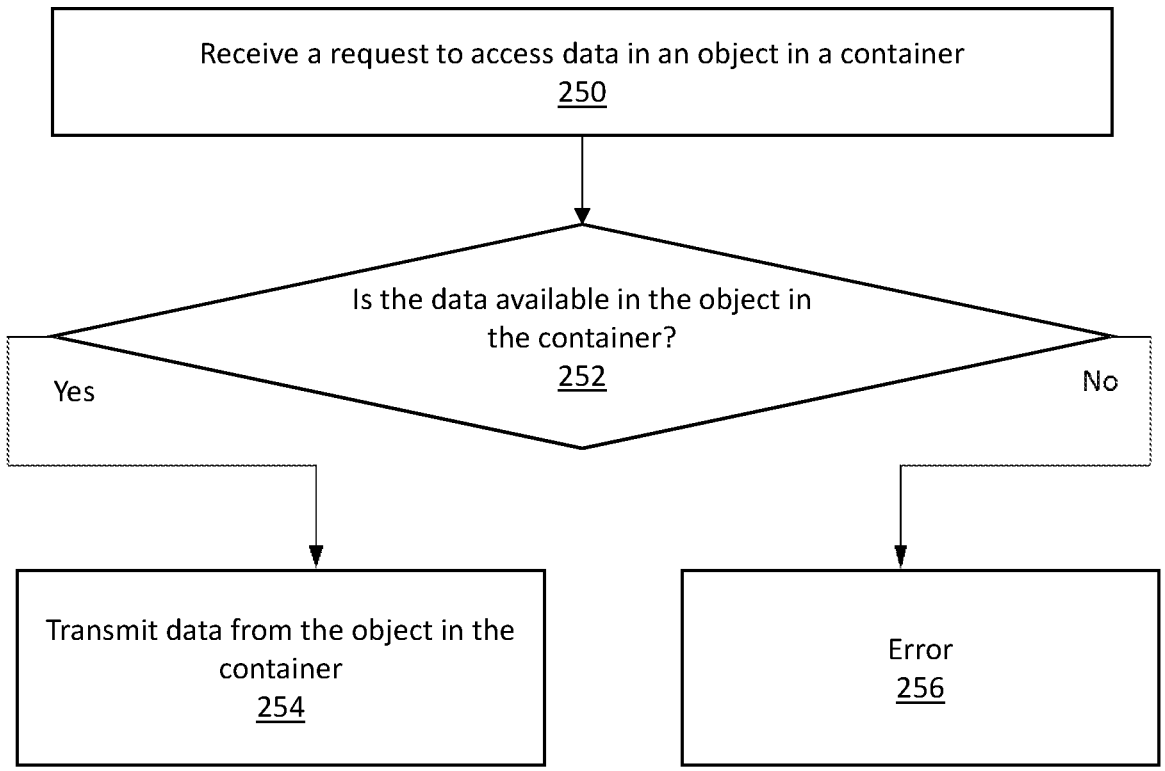
FIG. 2B illustrates an example set of operations performed by an object-based storage system for reading data in a tape volume container in accordance with one or more embodiments.

FIG. 2B depicts an example set of operations for retrieving data from a tape volume container, from the perspective of the object-based storage system 110, in accordance with one or more embodiments. One or more operations illustrated in FIG. 2B may be modified, rearranged, or omitted altogether. Accordingly, the particular sequence of operations illustrated in FIG. 2B should not be construed as limiting the scope of one or more embodiments.

In an embodiment, the object-based storage system receives a request to access data in an object in a container (Operation 250). The data management engine may have converted the request to a form understandable by the object-based storage system, before forwarding the request to the object-based storage system. The object-based storage system sees the request as an ordinary request to access data in an object in a container. This may include, for example, a pointer to a particular object, and an offset.

Next, the object-based storage system determines whether the data can be accessed from the object in the container (Operation 252). The object-based storage system checks to see whether the requested data is located at the specified location. In an embodiment, the system performs a checksum, to see if the data in the object matches the requested data, as specified in the metadata associated with the requested data. If the checksum matches, the system proceeds with retrieving the requested data.

If the data can be accessed from the object in the container, then the object-based storage system transmits the data from the object in the container (Operation 254). The object-based storage system may transmit the data stream wirelessly over the internet, and/or physically via a wire or a bus. The object-based storage system may transmit data, one object at a time, in response to a request for a particular object.

If the data cannot be accessed from the object in the container, then the object-based storage system returns an error (Operation 256). For example, the object-based storage system transmits information to the data management engine, indicating that the data is not at the specified location. The object-based storage system may transmit an error message indicating that the data is corrupted, or otherwise inaccessible.

4. Storing Data to a Tape Volume Container

Figure 3:
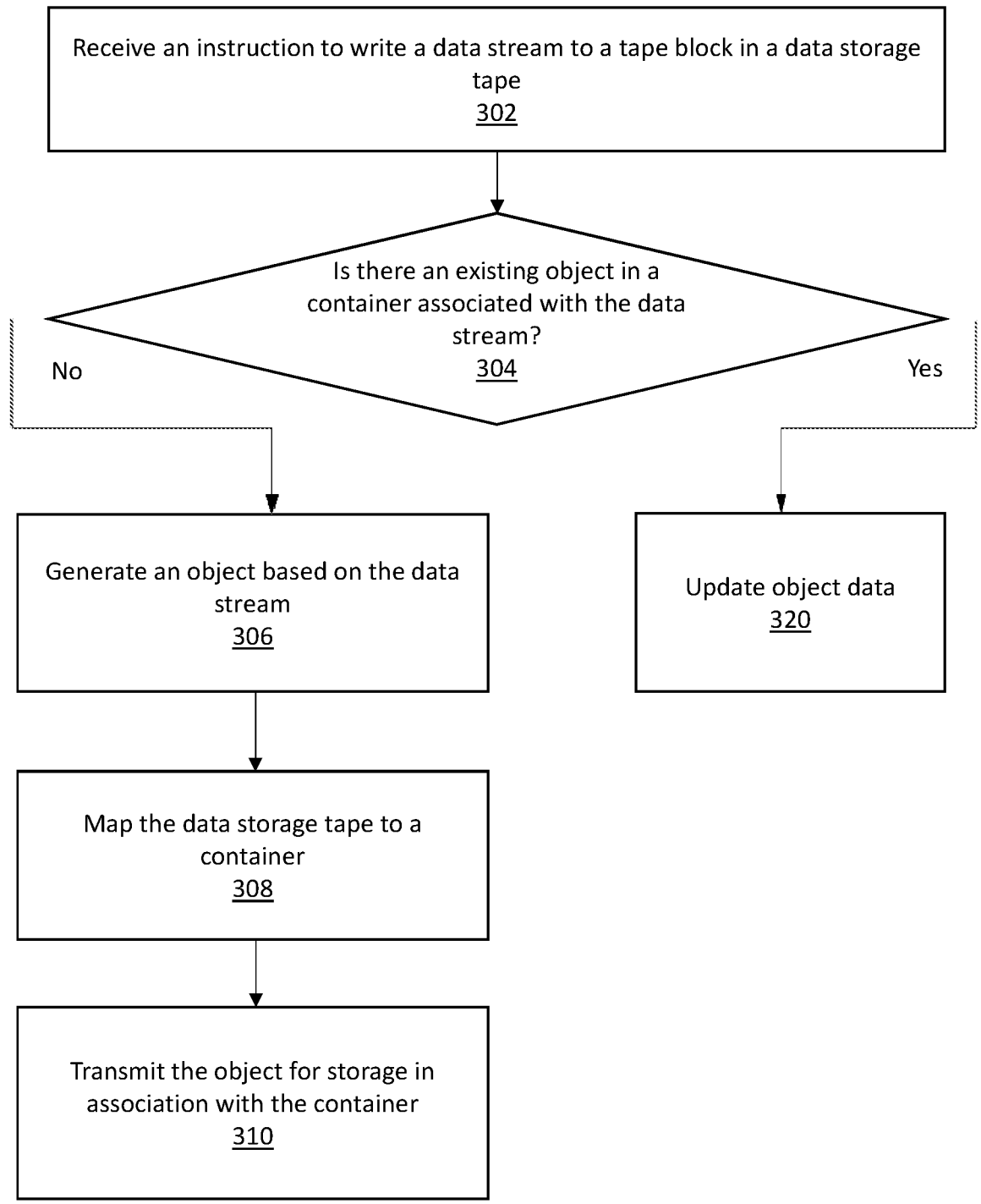
FIG. 3 illustrates an example set of operations performed by a data management engine for writing data to a tape volume container in accordance with one or more embodiments.

FIG. 3 illustrates an example set of operations for storing data to a tape volume container, in accordance with one or more embodiments. One or more operations illustrated in FIG. 3 may be modified, rearranged, or omitted altogether. Accordingly, the particular sequence of operations illustrated in FIG. 3 should not be construed as limiting the scope of one or more embodiments.

In an embodiment, the data management engine receives an instruction to write a data stream to a tape block in a data storage tape (Operation 302). For example, the data management engine receives an instruction, from a user, to save a file to a tape block. As another example, the archiving engine transmits an instruction to archive data to a tape block. The conversion engine may convert a received instruction to a format corresponding to the object-based storage system, to forward at least part of the request to the object-based storage system.

In an embodiment, the data management engine determines whether there is an existing object in a container associated with the data stream (Operation 304). For example, the data management engine transmits a request to the object-based storage system to determine whether the specified data exists in the object-based storage system. In an embodiment, metadata local to the data management engine catalogs tape volume containers in the object-based storage system. The data management engine checks the local metadata to determine whether an existing object corresponds to the tape block. The data management engine may perform a checksum to validate the data stored to the object.

If there is an existing object in a container associated with the data stream, then the data management engine updates the object data (Operation 320). In an embodiment, the data management engine transmits the data stream to the object-based storage system, with instructions to overwrite the object. Alternatively or additionally, the data management engine may append object data to preexisting data. Prior to transmission, the data management engine may convert the data to TAR format.

If there is no existing object in a container associated with the data stream, then the data management engine generates an object based on the data stream (Operation 306). In an embodiment, the data management engine creates an object, corresponding to the data block. As opposed to traditional objects, which may be associated with a file or a file folder in a file system, the object is associated with a particular tape block in a data storage tape. The object may be named in a format recognizable as a tape block in a data storage tape. For instance, the name of the object includes the name of the corresponding tape block. A tape block is mapped onto the object. In other embodiments, the object may be preexisting, or generated by the object-based storage system.

The data management engine further associates the object with the corresponding data stream. The data management engine stores some or all of the data stream to the object. In an embodiment, the entire data stream is stored to the object. In another embodiment, the data stream is broken up into several objects, corresponding to several data blocks. For example, policy may dictate that each data block should hold a certain amount of data, e.g. 10, 15, 16, or 20 MB. For larger files, the data management engine must divide the data among several objects. For smaller files, the data management engine stores multiple files to an object.

The data management engine maps the data storage tape to a container (Operation 308). The system creates a tape volume container, in the object-based storage system. Alternatively, the system may use a preexisting container in the object-based storage system. In either case, the data management engine maps the container to the data storage tape specified in the instructions at block 302. In an embodiment, the data management engine gives the container a name referencing the specified data storage tape.

After mapping the data storage tape to a container, the data management engine transmits the object for storage in association with the container (Operation 310). As an example, the object is transmitted to the object-based storage system via Small Computer System Interface (SCSI), with instructions to store the object to the container. In an embodiment, the data management engine converts the data to TAR format, from another format prior to transmission. The data management engine then transmits the data for storage in the container in the object-based storage system, in a sequential data stream, in TAR format.

As an example, a user saves a file, "File Y," to a local file system. The local file system is part of a hierarchical file management system, wherein an archiving engine periodically searches the local file system for files to be archived. The files are archived to remote cloud storage (the object-based storage system 110). The hierarchical file management system has a policy to archive files that have not been edited in the last week, and delete the local copy of the archived files. Periodic deletion of the local copy may be necessary if local storage is limited. File Y has not been accessed in a week, and, therefore, the archiving engine identifies File Y as a file to be archived. The archiving engine transmits an instruction to the data management engine, to write a data stream to a tape block in a data storage tape. In particular, the data management engine receives instructions to write a data stream, containing the data for File Y, to data storage tape "tp2000," at block 1.

The data management engine checks whether there is an existing object in a container associated with the data stream. The data management engine queries the cloud storage system for an object associated with the data stream, by searching for metadata indicating that the corresponding object contains some or all of File Y. The data management engine receives a reply that there is not any such object. The data management engine determines that there is not an existing object in a container associated with the data stream.

In response to determining that there is no existing object in a container associated with the data stream, the data management engine generates an object based on the data stream. The data management engine creates a new object. The data management engine maps the object to tape block 1. The data management engine names the object so that the object name includes "tp2000" and "1." The object name references the data storage tape and tape block, respectively. The object is associated with File Y.

Next, the data management engine maps the data storage tape to a container. The data management engine generates a container corresponding to the new object, including "tp2000" in the container name. The data management engine maps the data storage tape, tp2000, to the container. The container is recognizable as a data storage tape by the tape block client.

Next, the data management engine initializes the transfer of the object mapped to tp2000, block 1, to the object-based storage system. The object is streamed, in TAR format, to the object-based storage system.

The data management engine has initiated a data stream with all the markers of a data transfer to a tape block. In an embodiment, once the data stream has initiated, the data management engine can transfer control to the tape block client. The tape block client can proceed to write operations, as if it were writing data to a standard tape called tp2000.

5. Example Embodiments

A. Metadata

In one example, the system uses metadata to manage data operations. The system includes local, file-based storage and a remote, cloud storage system (object-based storage system 110). The archiving engine periodically determines that a given file should be archived to the object-based storage system, based on policy. To facilitate sharing files between the local and remote storage systems, two-layer metadata is used.

In the local storage, the data management engine stores files, and archive metadata associated with each file in the file system. The archive metadata includes information describing where the data for a given file is located. For example, the archive metadata includes the name of a container (mapped to a data storage tape), a position within that tape volume container, and an offset. Storing metadata describing data stored in the object-based storage system locally is particularly useful when the data is stored remotely. For example, in many cloud storage systems, it may take up to four hours to retrieve data. It therefore is desirable to have metadata describing remotely-stored data stored locally, where the information is available for immediate retrieval.

In the object-based storage system, container metadata is stored in one of several metadata containers. The container metadata includes information about what information is in the container and how to find it. The container metadata includes the number of existing files and blocks stored to the container. The container metadata further includes manifests for previous write sessions, including a list of files, with corresponding blocks for each file. The container metadata may also include a checksum. The metadata containers are configured like the information region on a traditional tape—the metadata containers include information about the data on a tape block, and a corresponding checksum. The checksum is similar to a tape drive's inner and outer CRC codes, which enable a length check before spooling the tape block. The container metadata is in this manner configured to be understandable by a tape block client.

For example, the system receives a request, from a user, to write a file, File A, into the local file-based storage system. File A is 100 MB in size. Initially, the archive metadata for File A is empty.

The archiving engine searches the local storage system for files to be archived. The archiving engine identifies File A as needing to be archived. The archiving engine transmits an instruction to write a data stream to a tape block in a data storage tape, to the data management engine. The instruction specifies to write the data to tape volume "tp1000." The archiving engine begins converting files from the local storage system into a TAR format, each file having a 512-byte TAR header.

The data management engine places File A into a group of files to be archived together in TAR format. The TAR data stream is divided into tape blocks of a given size. Files are grouped together according to policy, which dictates that the data is grouped into 16 MB blocks.

The data management engine maps the data storage tape to a container. The data management engine generates a container and associates it with the specified tape volume, tp1000. The data management engine names the container accordingly: "cloudlib.data@tp1000."

Figure 4:
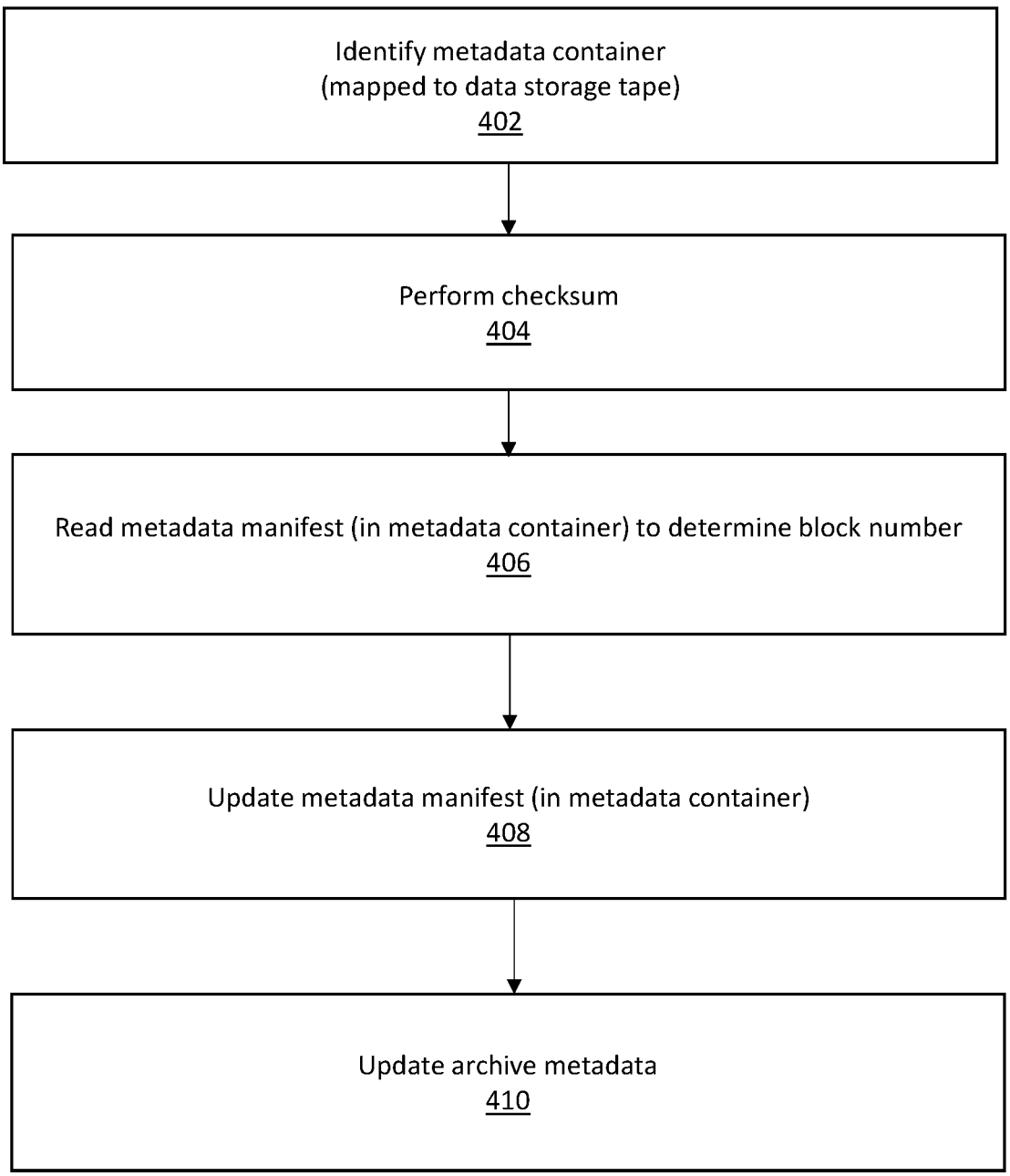
FIG. 4 illustrates an example set of operations for updating metadata in accordance with one or more embodiments.

As the data management engine transmits the object for storage in association with the container, the data management engine updates the metadata. FIG. 4 illustrates an example set of operations for updating metadata, in accordance with one or more embodiments. One or more operations illustrated in FIG. 4 may be modified, rearranged, or omitted altogether. Accordingly, the particular sequence of operations illustrated in FIG. 4 should not be construed as limiting the scope of one or more embodiments.

The data management engine identifies the metadata container, mapped to the data storage tape (Operation 402). The name of the data storage tape is used to identify the associated data and metadata containers. File A is associated with the data container, "cloudlib.data@tp1000," mapped to tp1000. Similarly, the metadata container is called, "cloudlib.meta@tp1000."

Next, the data management engine performs and checks a checksum to ensure data protection (Operation 404). Checksum information is stored to both the archive metadata and the container metadata. The data management engine then compares the checksums.

The data management engine reads the metadata manifest to determine the block number at which to begin appending data (Operation 406). For tp1000, the metadata manifest includes several files, and the virtual tape blocks containing data for those files:
file-000001.000000 (blocks 0-409)
file-000002.000410 (blocks 410-641)
file-000003.000642 (blocks 642-965)
file-000004.000966 (blocks 966-1006)
file-000005.001007 (blocks 1007-1050).

The data management engine reads the metadata manifest, and determines that data should be appended for File A, beginning at block 1051.

Next, the data management engine transmits the object for storage in association with the container. The data management engine begins appending data to tp1000, in sequential TAR format. The data management engine transmits each tape block to the object-based storage system, in turn, as an asynchronous transfer. First, the data management engine transmits the first block of data in File A to block 1051.

As the data management engine writes a new block, it updates the corresponding metadata manifest (Operation 408). Because the data management engine has just transmitted data to block 1051, the data management engine adds
file-000006.001051 (block 1051)
to the metadata manifest. File A has been given a numerical name for use within the object-based storage system. The metadata also indicates that this file is called File A.

The data management engine continues writing tape blocks and updating metadata until the entire file has been transferred. After 102 blocks have been transferred, File A is completely transferred, and the tape write session is complete.

After all tape blocks have been transferred, a close operation is performed. The close operation causes the data management engine to stop any outstanding object transfers. The current write session to the data container is closed.

Next, the data management engine writes the completed metadata manifest object, "cloudlib.meta@tp1000/file-000006.001051, which contains manifest entries for blocks 1051-1152. When the data has been written, the metadata container cloudlib.meta@tp1000 contains the following information:
6 existing files, total of 1153 blocks
manifests for previous write sessions:
file-000001.000000 (blocks 0-409)
file-000002.000410 (blocks 410-641)
file-000003.000642 (blocks 642-965)
file-000004.000966 (blocks 966-1006)
file-000005.001007 (blocks 1007-1050)
file-000006.001051 (blocks 1051-1152).

The newly updated metadata manifest indicates that File A is stored at blocks 1051-1152.

Because the write was successful, the data management engine updates the archive metadata to specify the file location (Operation 410). For File A, the archive metadata specifies the following:
media type: cl
vsn: tp1000
position: 1051
offset: 512.

Type "cl" indicates that the file is stored in a tape volume container in the cloud. Vsn tp1000 indicates that the file is stored in the container mapped to the data storage tape tp1000. Position 1051, and offset, 512 indicate that File A begins at block 1051, offset 512 within that cloud container.

The metadata is also used for reading operations. Now that File A has been written to a tape volume container, File A can be retrieved for reading using the metadata as follows.

First, the system receives information indicating that a user has attempted to read File A from the local storage system. Upon receiving notification that a user has tried to read File A, the data management engine checks the archive metadata for File A. The archive metadata includes the designation "cl," denoting that File A is stored to a tape volume container in the cloud. The data management engine performs a checksum, confirming that File A is stored at the specified location.

To retrieve the object from the container, the data management engine sends a command to the object-based storage system: "position to 1051." This tells the object-based storage system to initialize retrieval from the object mapped to data block 1051. The object-based storage system sets its internal state to prepare to begin reading the object mapped to block 1051.

Next, the data management engine begins reading objects, starting with "cloudlib.data@tp.1000/block.00151. As each block is loaded, the data management engine calculates a checksum, and checks the checksum against the corresponding checksum from the manifest read during load time.

After verification, the data management engine transmits data from each block sequentially. Upon reading a block, the data management engine proceeds to the next sequential block. After transmitting data for block 151, the data management engine returns data for "cloudlib.data@tp.1000/block.001052." After that, the data management engine returns data from the object "cloudlib.dat@tp.1000/block.001053." The data management engine continues to send blocks sequentially until all blocks have been transmitted.

After reading each block, the data management engine verifies the expected TAR header, according to the archive metadata. If successful, the data management engine writes the data sequentially to the local storage system for each tape block read. For File A, which is 100 MB, 7 tape blocks are read. The File A data begins at offset 512 of the first block, and ends at offset 4194816 of the last block.

After all File A data is successfully written to local storage, the data management engine marks the file as online in the local storage system, in the archive metadata. In the archive metadata, the media type is changed to 'fi,' indicating that the file is a locally-stored file. The file is now available for use as a local file, through the local file system.

B. Restore Operation

In an example, the operations further include a restore operation, wherein an object is restored from an offline storage system to an online storage system for the retrieval.

In an embodiment, the restore operation is performed when reading data. When retrieving data from an object-based storage system, the data may be either offline, or online (restored). If the data is offline, then the data must be restored before it can be retrieved. This process may take as much as several hours. For example, in a cloud storage system, it is common to have some data stored on the cloud, where the data is immediately accessible. Other data is stored in offline storage centers, where the data must be restored to the cloud before the data is immediately accessible.

Upon receiving a request to access a tape block, the data management engine determines whether the requested tape block is online or offline. The data management engine may check local metadata (as described above in section 5A) to determine the status of the object associated with the requested data block. If the data is online, then no restore operation is required. If the data is offline, then a restore operation is required.

In an embodiment, if the requested data is offline, the system restores the object from the offline storage system to an online storage system for the retrieving operation. This step may be performed by the object-based storage system, responsive to a request from the data management engine. For example, the data management engine transmits a request, to the object-based storage system, to restore a data block. Responsive to the request, the object-based storage system copies the object mapped to the requested data block, from a remote storage system to online storage.

The system may perform the restore operation on several data blocks at once. For example, the data management engine waits until it has received a certain number of requests to retrieve data before performing a restore operation. The data management engine then initiates a restore operation for the group of data blocks simultaneously.

In an embodiment, the data management engine receives a request to access a tape block, then identifies one or more tape blocks related to the requested tape block. For example, the data management engine receives a request to access File B, on tape block B. The data management engine determines that File C, on tape block C, is an updated version of file B. The data management engine also restores File C, along with File B, by restoring tape block B and tape block C.

Subsequent to identifying tape blocks to restore, the data management engine maps each of the tape blocks to a corresponding object. The data management engine restores the objects, associated with the requested tape blocks, to the online storage system for retrieval. The data management engine may request the objects to be restored simultaneously, as in a single command. The data management engine may request the objects to be restored in close proximity to one another, as in one command per object, executed in succession.

For example, the data management engine determines that 10 files must be retrieved from object-based storage. Each of the 10 files is associated with a different tape block. The data management engine identifies the 10 tape blocks associated with each of the 10 files to be retrieved. The archiving engine then determines the 10 objects to which each of the 10 tape blocks has respectively been mapped. The data management engine waits for the 10 requested blocks to be restored, then begins to read the blocks.

For example, the restore process takes four hours. Because of this delay, it is beneficial to perform multiple associated restore operations at once. Otherwise, as each offline object is requested, a restore would be initiated, which could result in a separate four-hour delay for each object. It is more efficient for the data management engine to request several restore operations to be performed together.

C. Efficient Tape Block Size; Encryption

In an embodiment, the data management engine groups data into a tape block of a particular size, based on efficiency considerations. For example, in many cloud storage systems, it is more cost effective to send and receive large blocks of data, rather than performing multiple operations on small blocks of data. Some cloud storage systems charge a penalty for sending a file smaller than 10 MB.

In an embodiment, the data management engine uses a 16 MB object size. It has been found that this object size avoids penalties incurred for sending smaller files. The object size is still small enough to achieve sufficient streaming performance. In order to ensure that each object is as close to 16 MB as possible, the data management engine assembles data into 16 MB blocks, before performing a read or write operation.

For example, the archiving engine determines that ten files should be archived. Each of the ten selected files is 4 MB in size. The data management engine places the ten files into a group of files, to be archived together, in TAR format. The archiving engine groups 4 of the files into a data block, so that the data block contains 16 MB of data.

In an embodiment, the data management engine encrypts the data before transmitting the data to the object-based storage system. Any techniques known today or later developed may be used for encrypting data. Any number of components may be involved in encrypting data. Encryption of data is not limited to any specific techniques or components. For example, a data block may be selectively encrypted, as described in U.S. Pat. No. 8,892,905 B2 (Method and Apparatus for Performing Selective Encryption/Decryption in a Data Storage System), incorporated by reference.

D. Interfacing with a Physical Tape Volume

In an embodiment, the system enables the physical import or export of data from a physical tape volume to or from an object-based storage system. Because objects and containers are mapped to tape blocks and tape volumes, the data therein can be easily transferred to and from a physical tape volume.

For example, 8 TB of data is to be archived to an object-based storage system. It would be much more efficient to send such a large amount of data to the object-based storage system physically, rather than over a network. Mapping data storage tapes into the object-based storage system allows the system to take a physical tape volume, and map the tape volume to containers in the object-based storage system. The system can migrate data to the object-based storage system more efficiently. Similarly, the system can generate a physical tape volume from a tape volume container.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
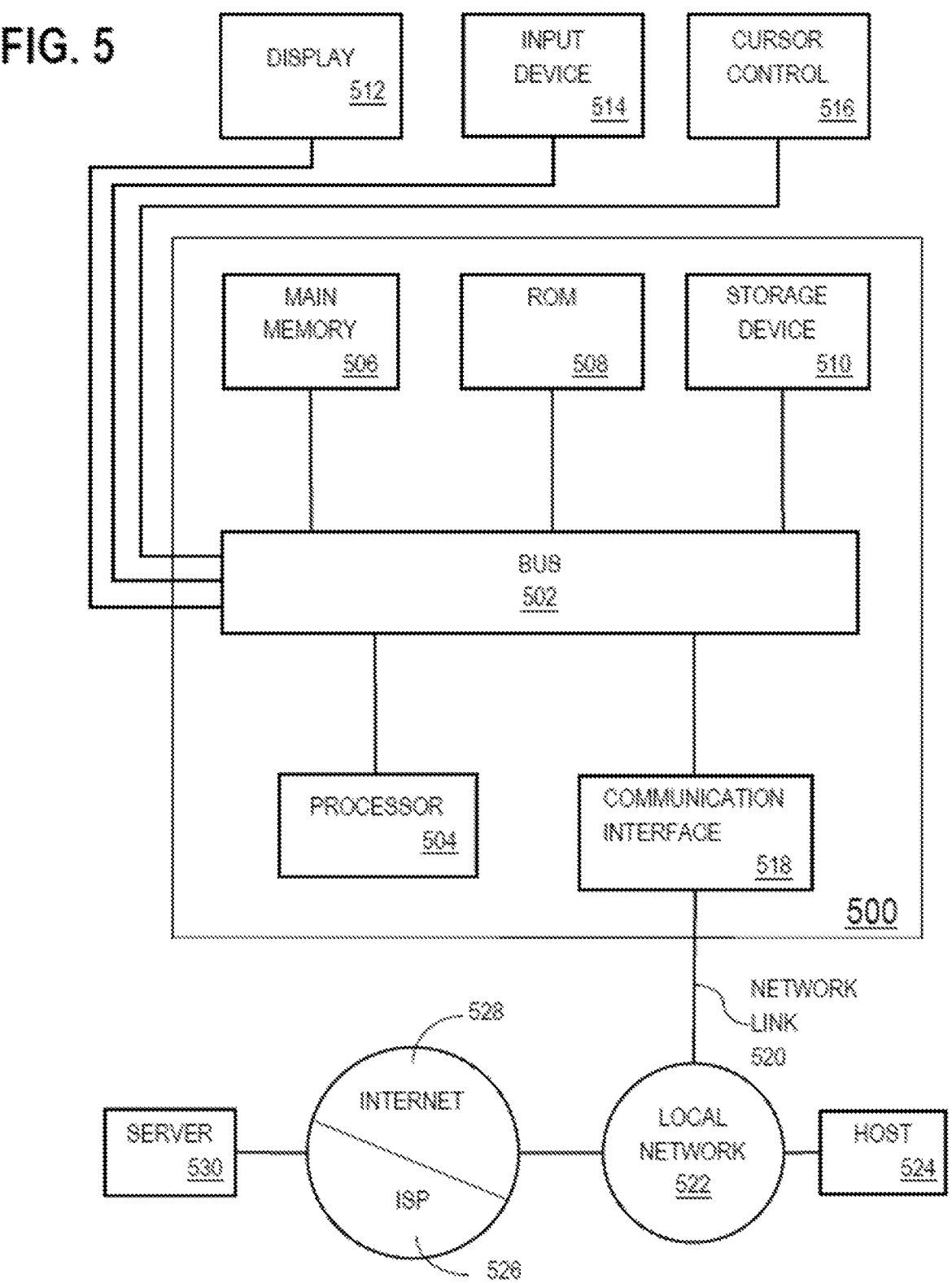
FIG. 5 illustrates a block diagram of a system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media include, for example, optical or magnetic disks, such as storage device 510. Volatile media include dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media are distinct from but may be used in conjunction with transmission media. Transmission media participate in transferring information between storage media. For example, transmission media include coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

receiving, from a client, a request to access a tape block in a data storage tape, wherein data, corresponding to the request to access the tape block, is (a) not actually stored in any tape and (b) is instead stored in an object in a container of a plurality of containers of an object-based storage system;

in response to receiving the request to access the tape block:

identifying a plurality of tape blocks in an offline portion of the object-based storage system, the plurality of tape blocks comprising to the requested tape block;

mapping each of the plurality of tape blocks to a corresponding plurality of objects in the object-based storage system;

restoring for retrieval the plurality of objects from the offline portion of the object-based storage system to an online portion of the object-based storage system;

mapping the tape block in the data storage tape, requested by the client, to at least one object of the plurality of objects in the container of the plurality of containers, wherein the container is an organizational structure for the plurality of objects stored in the object-based storage system;

converting the received request to access the tape block into a format corresponding to the object-based storage system;

retrieving object data from the at least one object in the container according to the converted request in the format corresponding to the object-based storage system;

generating, from the retrieved object data, a data stream in a tape archive format; and transmitting the data stream, generated from the object data, in the tape archive format in response to the request from the client to access the tape block.

2. The medium of claim 1, wherein the plurality of containers is implemented in a cloud storage system remote from a device performing the transmitting operation.

3. The medium of claim 1, wherein the plurality of containers is implemented in a storage system local to a device performing the transmitting operation.

4. A non-transitory computer readable medium comprising instructions which, when executed by one or more hardware processors, causes performance of operations comprising:

receiving, from a client, an instruction to write a data stream to a tape block in a data storage tape, wherein data, corresponding to the instruction to write to the tape block is (a) not actually to be written to a tape and (b) is instead to be written to in an object in a container of a plurality of containers of an object-based storage system;

in response to receiving the instruction to write to the tape block:

identifying a plurality of tape blocks in an offline portion of the object-based storage system, the plurality of tape blocks comprising to the tape block to be written to;

mapping each of the plurality of tape blocks to a corresponding plurality of objects in the object-based storage system;

restoring the plurality of objects from the offline portion of the object-based storage system to an online portion of the object-based storage system;

updating an object, of the restored plurality of objects, based on the data stream specified by the client;

mapping the data storage tape to the container of the plurality of containers, wherein the container is an organizational structure for a set of objects stored in the object-based storage system;

converting the received instruction to write the data stream to the tape block into a format corresponding to the restored online portion of the object-based storage system; and transmitting the updated object with the converted instruction in the format corresponding to the object-based storage system for storage in association with the container of the plurality of containers, in response to the instruction from the client to write the data stream to the tape block.

5. The medium of claim 4, wherein the plurality of containers further comprises metadata associated with a particular container;

the metadata comprising data location information comprising the name of the particular container and an offset;

and the operations further comprise updating the metadata with the data location information.

6. The medium of claim 5, wherein the metadata further comprises identification information for data on the data storage tape and instructions for accessing the data on the data storage tape.

7. The medium of claim 4, wherein the plurality of containers further comprises metadata associated with a particular container;

the metadata comprising data location information comprising the name of the particular container and an offset;

and the operations further comprise updating the metadata with the data location information.

8. The medium of claim 4, wherein the operations further comprise: translating the instruction into a form corresponding to a cloud storage system.

9. A system comprising:

one or more hardware processors;

one or more non-transitory computer-readable media storing instructions which, when executed by the one or more hardware processors, cause execution of operations comprising:

receiving, from a client, a request to access a tape block in a data storage tape, wherein data, corresponding to the request to access the tape block is (a) not actually stored in any tape and (b) is instead stored in an object in a container of a plurality of containers of an object-based storage system;

in response to receiving the request to access the tape block:

identifying a plurality of tape blocks in an offline portion of the object-based storage system, the plurality of tape blocks comprising to the requested tape block;

mapping each of the plurality of tape blocks to a corresponding plurality of objects in the object-based storage system;

restoring for retrieval the plurality of objects from the offline portion of the object-based storage system to an online portion of the object-based storage system;

mapping the tape block in the data storage tape, requested by the client, to at least one object of the plurality of objects in the container of the plurality of containers, wherein the container is an organizational structure for a plurality of objects stored in the object-based storage system;

converting the received request to access the tape block into a format corresponding to the object-based storage system;

retrieving object data from the at least one object in the container according to the converted request in the format corresponding to the object-based storage system; and generating, from the retrieved object data, a data stream in a tape archive format;

transmitting the data stream, generated from the object data, in the tape archive format in response to the request from the client to access the tape block.

10. The system of claim 9, wherein the plurality of containers is implemented in a cloud storage system remote from a device performing the transmitting operation.

11. The system of claim 9, wherein the plurality of containers is implemented in a storage system local to a device performing the transmitting operation.

12. A system comprising:

one or more hardware processors;

one or more non-transitory computer-readable media storing instructions which, when executed by the one or more hardware processors, cause execution of operations comprising:

receiving, from a client, an instruction to write a data stream to a tape block in a data storage tape, wherein data, corresponding to the instruction to write to the tape block is (a) not actually to be written to a tape and (b) is instead to be written to an object in a container of a plurality of containers of an object-based storage system;

in response to receiving the instruction to write to the tape block:
identifying a plurality of tape blocks in an offline portion of the object-based storage system, the plurality of tape blocks comprising to the tape block to be written to;
mapping each of the plurality of tape blocks to a corresponding plurality of objects in the object-based storage system;
restoring the plurality of objects from the offline portion of the object-based storage system to an online portion of the object-based storage system;
updating an object, of the restored plurality of objects, based on the data stream specified by the client;
mapping the data storage tape to the container of the plurality of containers, wherein the container is an organizational structure for a set of objects stored in the object-based storage system;
converting the received instruction to write the data stream to the tape block into a format corresponding to the restored online portion of the object-based storage system; and
transmitting the updated object with the converted instruction in the format corresponding to the object-based storage system for storage in association with the container of the plurality of containers, in response to the instruction from the client to write the data stream to the tape block.

13. The system of claim 12 wherein the plurality of containers further comprises metadata associated with a particular container;
the metadata comprising data location information comprising the name of the particular container and an offset;
and the operations further comprise updating the metadata with the data location information.

14. The system of claim 13, wherein the metadata further comprises identification information for data on the data storage tape and instructions for accessing the data on the data storage tape.

15. The system of claim 12, wherein the plurality of containers further comprises metadata associated with a particular container;
the metadata comprising data location information comprising the name of the particular container and an offset;
and the operations further comprise updating the metadata with the data location information.

16. The system of claim 12, wherein the operations further comprise: translating the instruction into a form corresponding to a cloud storage system.

* * * * *